Nov. 5, 1968 W. A. BRADLEY ET AL 3,409,135
REPLACEABLE FILTER LIQUID PUMP
Filed Nov. 4, 1966
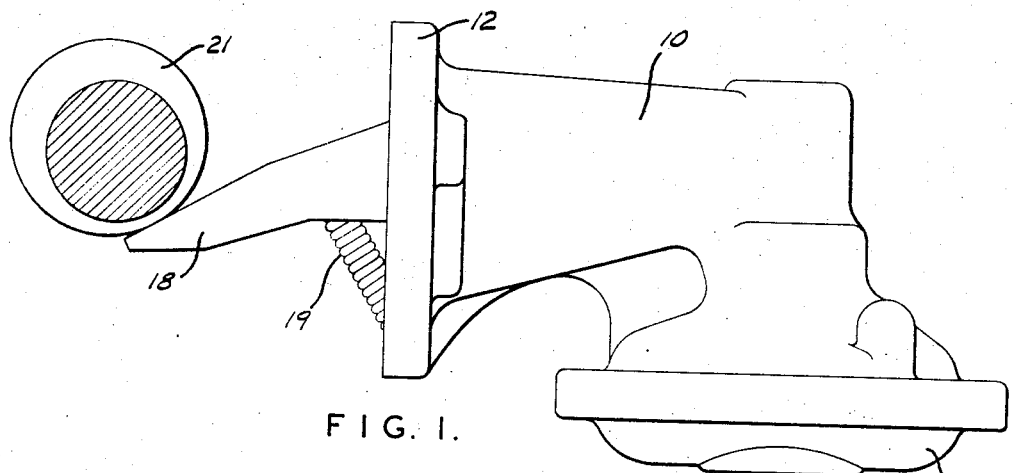
FIG. 1.
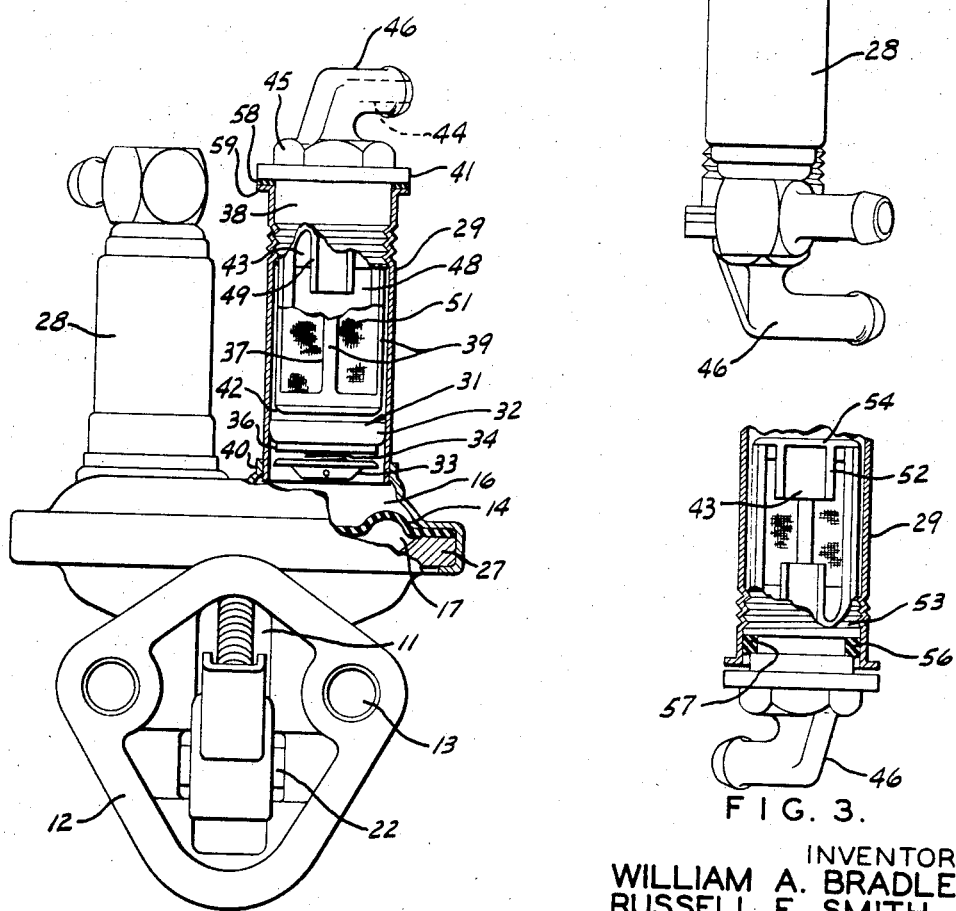
FIG. 2.
FIG. 3.
INVENTORS
WILLIAM A. BRADLEY
RUSSELL F. SMITH
BY
Robert S. Burns
ATTORNEY

United States Patent Office 3,409,135
Patented Nov. 5, 1968

3,409,135
REPLACEABLE FILTER LIQUID PUMP
William A. Bradley, Kirkwood, and Russell F. Smith,
Ferguson, Mo., assignors to ACF Industries, Incorporated, New York, N.Y., a corporation of New Jersey
Filed Nov. 4, 1966, Ser. No. 592,170
4 Claims. (Cl. 210—136)

ABSTRACT OF THE DISCLOSURE

An automotive diaphragm type fuel pump is provided with a replaceable filter element in the form of an insertable screen held by extensions on a body member which is inserted into a cavity in the pump. The body member includes a fitting for receiving a fuel line and also has provisions for an air dome to reduce pulsations generated by the pump.

---

This invention relates to a fuel pump. It relates in particular to a mechanically or electrically actuated fuel pump, the improvement therein consisting of a replaceable cartridge filter disposed in either or both of the pump inlet and outlet chambers to permit ready removal and replacement of the cartridge.

Most automatic fuel pumps as well as fuel pumps for use on any form of internal combustion engine, are susceptible to damage and a reduced life expectancy due to foreign material being carried by the fuel. In accordance with the nature of the foreign matter, the pump itself may be damaged or reduced in efficiency. More critically, the engine might be adversely affected by the lodging of solid particles between, or in contact with close fitting moving parts.

With the ever increasing degree of sophistication and clock like precision being incorporated into automotive engines and fuel systems, the need for eliminating prospective danger sources from the fuel has become imperative. This aspect of automobile design has achieved added importance within the past several years not necessarily because of the increased amount of contaminating material in the fuel but rather because of the necessity for keeping the engine free of extraneous foreign matter.

The problem of fuel contamination and the filtering out of contaminants therefrom, has of course not gone unnoticed. To the contrary, many expedients have been developed and are in use today for clearing contaminated fuels. One method is to filter the fuel prior to its introduction to the vehicle gas tank. This of course removes much of the dirt, scale and other matter which the fuel may have picked up while in storage or while being transported. Fuel filters and filtering devices have of course in the past been incorporated into automotive fuel systems in the form of the line type replaceable filters connected into the system preferably upstream of the pump. Also the familiar removable glass bowl type filter has seen extensive use. In this form of unit, the glass bowl permits visual observation of the condition of the fuel and also permits cleaning of the bowl when excessive dirt has accumulated. These and many other devices have proven to be successful in varying degrees. However, it is understood that such units also add to the cost of a fuel system as well as using valuable space.

In the instance of the latter, space under the hood of an automobile has been severely curtailed due to the many accessories and equipment now being carried by automobiles, which must of necessity have components located adjacent to the engine.

What is contemplated in the presently disclosed arrangement is essentially a fuel pump having built integrally therewith one or more removable fuel filter cartridges. The latter are preferably accessible to permit quick and easy replacement. The pump itself follows a design well known in the art and includes, a pumping chamber having check valves, and check valve housings disposed both upstream and downstream of a pumping chamber to provide a regulated unidirectional fuel flow. One or both of the check valve housings holds a removable filter cartridge which may be replaced periodically as the need arises.

While it is presently contemplated that a throw away type filter cartridge be utilized this is not necessarily true. The cartridge may for example consist of a unit that is adapted to be cleaned to remove accumulated dirt and other solid matter and then replace.

It is therefore one object of the invention to provide a novel fuel, or other liquid type pump embodying one or more filter members incorporated therein. A further object is to provide a fuel pump in which one or more replaceable filter units are held in a manner that the latter may be removed for periodic replacement. A still further object of the invention is to provide a novel fuel filter cartridge adapted to be readily inserted into and removed from a fuel pump without disturbing the latter. Still another object of the invention is to provide a filter cartridge of the type described embodying an integral air dome built within the filter cartridge for affording improved pumping efficiency. These and other objects will be readily appreciated by those skilled in the art from the following disclosure.

In the drawings, FIGURE 1 is a side elevation of a fuel pump embodying the hereinafter described invention.

FIGURE 2 is an end view of the fuel pump shown in FIGURE 1 is an inverted position, a portion thereof being shown in cross section and with parts of the wall broken away to illustrate internal members.

FIGURE 3 is a segmentary view as shown in cross section of an alternate embodiment of the filter cartridge illustrated in FIGURE 2.

Referring to FIGURES 1 and 2 the presently described invention is incorporated into a mechanically actuated pump similar in structure and operation to that shown in U.S. Patent 3,150,601, R. F. Smith et al. This construction consists primarily of a pump casing 10 having a passage 11 extending therethrough. The casing is provided at one end with a flange 12 having mounting holes 13 adapted to align with corresponding holes in an engine cylinder block. The other end of casing 10 is so shaped to receive a flexible diaphragm 14 forming a pumping chamber 16, which diaphragm may be reciprocated by suitable mechanism for passing fluid through the pump. Diaphragm 14, as shown in FIGURE 2, divides the pump into air chamber 17 and pumping chamber 16.

Air chamber 17 encloses the mechanism for actuating diaphragm 14 and while not presently shown in detail, normally includes a diaphragm biasing means such as a spring, together with means for connecting rocker arm 18 to the diaphragm actuating means such that the latter may be reciprocated through casing 10. Rocker arm 18 extends outwardly from the end opening in casing 10 and is pivotably mounted within the casing by a suitable pinning device 22 so that the end of the rocker arm may be oscillated by an engine driven cam 21 or the like. Rocker arm 18 is biased by spring 19 into engagement with the surface of the cam 21.

The pump is also provided with a housing 24 which is sealably clamped to casing 10 at a peripheral joint by peening the housing edge into contact with the rim 27 of the casing, forming a fluid tight seal. Casing 10 is further provided with a pair of valve enclosures 28 and 29 having flow ports therein, which depend from housing 24 in a substantially parallel direction and are adapted to receive a suitable check valve for regulating the flow of fluid through the pump.

As shown in FIGURE 2, check valve 31 in enclosure 29, is normally positioned immediately adjacent to housing 24. Said valve enclosures are normally an elongated thin walled metallic material, soldered or otherwise held in rim 40.

Check valve 31 include basically a cup-like member 32 having a plurality of apertures formed to communicate the upstream and downstream side of the valve. A central column positioned in the cup-like member supports a cap 33 which is spaced from said member 32 by a spring 34 disposed therebetween. A resilient diaphragm member 36 is biased into contact with the apertures in cup-like member 32 by spring 34. This diaphragm is susceptible to movement by fluid pressure on the upstream side to be displaced, thus permitting flow of fuel through the respective apertures as the pump is actuated. Normal construction for pumps of this type is to provide such a valve in both of the valve enclosures even though only one such valve is presently shown.

Referring to FIGURE 2, each valve enclosure 28 and 29 also holds a removable filter cartridge 37 which comprises a body 38 formed along a portion of the outer surface thereof to threadably engage the remote end of the similarly threaded valve enclosure 29 and to be positioned therein. Filter cartridge 37, when fastened into place compresses a seal ring 58 into contact with enclosure lip 59 thusly forming a liquid tight joint. The filter thus provides a readily removable closure to the pump.

Pump casing 10 may be mounted in such manner to permit the valve enclosures to protrude uwardly as in FIGURE 2. Alternatively the unit may be so disposed such that the valve enclosures depend downwardly. In either instance the filter cartridge will be basically identical, with only minor variations designed particularly to provide an air dome or space.

Referring to FIGURE 2, structurally the filter cartridge comprises a base or body 38 having a circumferential flange 41 and a hexagonal collar 45 to facilitate rotation. A fitting 46 protrudes from flange 41 and may be canted at a predetermined angle to best fit with a particular engine or fuel system. A passage 44 extending through fitting 46 and through body 38, carries fuel or other liquid to the filter chamber.

Body 38 is threaded for at least a portion of the circumferential surface to engage a corresponding section of the valve enclosure. While a threaded connection is found to be both practical and economical, it is by no means the only way in which the respective members may be brought into engagement.

A plurality of support columns 39 extend from the outer edge of body 38 in a general parallel direction. A cap 42 is fixed to the remote end of columns 39 to space and position the latter. Cap 42, as shown in FIGURE 2, forms an end wall to filter chamber 48.

A fine mesh filter screen 51 is carried on the respective support columns 39 to define the cylinderical filter chamber 48. The inner face of body 38 forms the opposite end of said filter chamber 48. A flow tube 49 extending from the inner face of body 38 accommodate fuel flow to or from chamber 48. As shown in FIGURE 2, flow tube 49 also defines an annular air dome 43 in the filter cartridge upper end when the pump is in the position shown.

In the embodiment of the cartridge shown in FIGURE 3, the air dome is disposed at the cartridge remote or cap end and is defined by a cylindrical rim 52 extending outwardly from a cap 54.

The cartridge base 53 includes a peripheral groove 56. A resilient gasket or deformable seal ring 57 is positioned in groove 56 and slidably engages the adjacent wall of the enclosure to form a peripheral fluid seal. This arrangement permits rotation of the entire cartridge unit to adapt the position of fitting 46 to a desired angle for connecting to the fuel system and still assures a tight peripheral seal.

The herein described fuel filter may assume a number of varying embodiments and still be utilized in the fuel pump described. For example in one embodiment the entire fuel pump cartridge is formed integrally of a material such as nylon, Delrin or similar fuel resistant thermoplastic resin. In a like manner the unit may be formed of a combination of metal or plastic members so assembled so as to provide the herein described features.

It is clear that the advantages provided by the present pump arrangement with one or more replaceable fuel filter cartridges are numerous. For example as shown in FIGURE 2, the fuel pump may be positioned on an engine block in a manner that the removable end of the cartridge is readily accessible either by a tool or directly by hand application to the cartridge. Removal of the cartridge is of course a relatively simple matter requiring only the disconnecting of the fitting 46 together with the fitting in the adjacent valve enclosure from its connection. Thereafter the filter may be either manually rotated from the enclosures 28 and 29 with a minimization of fuel loss. In a similar manner a clean or new replacement cartridge is inserted in the enclosure and likewise fastened therein and connected to the adjacent tubing or conduit integrating the pump with the fuel system.

Operationally, the fuel pump will function in a manner well known in such devices. However, with the use of the presently described cartridge, a fuel will enter the fitting 46 and thereafter be directed through flow tube 49 into the filter chamber 48. Solids and other undersirable matter contained in the fuel flow will tend to deposit against the filter screen while permitting passage of the filtered fuel therethrough. The latter then may traverse the check valves and enter the pumping chamber.

It is understood that the herein described embodiments of a removable fuel filter cartridge are representations of the invention concept, and minor changes and modifications may be made therein without departing from the spirit and scope of the invention as defined in the claims.

We claim:

1. In a fluid pump for an internal combustion engine having a drive member, said pump including: a flexible diaphragm movably fixed in the housing and forming a fluid pumping chamber, an actuating mechanism engaging said diaphragm and said drive member for effecting a pumping action on said fluid, said pump housing further including an open ended elongated enclosure depending from said housing and being communicated at one end thereof with said fluid pumping chamber to form a flow passage, a check valve disposed in said enclosure and being operable to provide unidirectional flow of fluid through the flow passage, a filter unit removably positioned in said enclosure to interrupt said flow of liquid and to remove particles of solid material therefrom, said disposable unit including:

(a) body disposed in said flow passage and including filtering means forming a filter chamber, (b) a head depending from said body and being exposed external to and extending from said enclosure to provide an end wall thereto, (c) means in said head forming a passage therethrough and communicating with said filter chamber for carrying a stream of said liquid and including a fitting adapted to receive a fuel carrying conduit, said fitting extending outwardly from said head.

2. A pump according to claim 1 in which the said means in said head forming a passage therethrough comprises a tubular extension inside said filter chamber, said tubular extension and said elongated enclosure forming an air dome.

3. A pump according to claim 1 further comprising a cap member at an end of said body, said cap member including means defining an air dome.

4. A pump according to claim 1 in which a sealing element is provided between an inner surface of said open ended elongated enclosure and said body whereby said body can be rotated to a desired position while maintaining a seal with the said inner surface.

References Cited

UNITED STATES PATENTS

| | | | |
|---|---|---|---|
| 394,390 | 12/1888 | Perkins | 210—416 X |
| 780,069 | 1/1905 | Shelden | 210—416 X |
| 1,932,676 | 10/1933 | Rockwell | 210—416 |
| 2,394,154 | 2/1946 | Curtis et al. | 210—416 X |
| 2,576,894 | 11/1951 | Ranst et al. | 210—416 |
| 3,150,601 | 9/1964 | Smith et al. | 103—150 |
| 3,236,383 | 2/1966 | Smith et al. | 210—416 X |
| 3,254,769 | 6/1966 | McArthur | 210—416 X |

REUBEN FRIEDMAN, *Primary Examiner.*

J. ADEE, *Assistant Examiner.*